US007962850B2

(12) United States Patent (10) Patent No.: US 7,962,850 B2
Haynes et al. (45) Date of Patent: Jun. 14, 2011

(54) CUSTOMIZING EMAIL SUBJECTS FOR SUBSCRIPTION GENERATED EMAIL MESSAGES

(75) Inventors: Thomas R. Haynes, Apex, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 903 days.

(21) Appl. No.: 11/877,298

(22) Filed: Oct. 23, 2007

(65) Prior Publication Data
US 2009/0106650 A1 Apr. 23, 2009

(51) Int. Cl.
*G06F 17/00* (2006.01)
(52) U.S. Cl. ......................... 715/271; 715/256
(58) Field of Classification Search .................. 715/271, 715/256, 260, 229
See application file for complete search history.

(56) References Cited

U.S. PATENT DOCUMENTS

| 4,970,665 | A * | 11/1990 | Doi et al. ....................... 715/210 |
| 6,185,603 | B1 * | 2/2001 | Henderson et al. ........... 709/206 |
| 6,832,244 | B1 * | 12/2004 | Raghunandan ............... 709/206 |
| 7,092,872 | B2 * | 8/2006 | Polanyi et al. .................... 704/9 |
| 7,321,887 | B2 * | 1/2008 | Dorner et al. ......................... 1/1 |
| 2001/0056463 | A1 * | 12/2001 | Grady et al. ................... 709/203 |
| 2002/0103858 | A1 * | 8/2002 | Bracewell et al. ............ 709/203 |
| 2003/0104805 | A1 * | 6/2003 | Weksel .......................... 455/414 |
| 2004/0119740 | A1 * | 6/2004 | Chang et al. .................. 345/751 |
| 2005/0031093 | A1 * | 2/2005 | Skladman et al. ......... 379/88.13 |
| 2005/0209914 | A1 * | 9/2005 | Nguyen et al. .................. 705/14 |
| 2005/0246775 | A1 * | 11/2005 | Chellapilla et al. .............. 726/22 |
| 2006/0059234 | A1 * | 3/2006 | Atchison et al. .............. 709/206 |
| 2006/0253597 | A1 * | 11/2006 | Mujica ........................... 709/229 |
| 2007/0100948 | A1 * | 5/2007 | Adams et al. .................. 709/206 |
| 2007/0156732 | A1 * | 7/2007 | Surendran et al. ............ 707/101 |
| 2007/0255694 | A1 * | 11/2007 | Wu .................................... 707/3 |
| 2008/0104181 | A1 * | 5/2008 | Golan ........................... 709/206 |
| 2008/0162651 | A1 * | 7/2008 | Madnani ....................... 709/206 |

FOREIGN PATENT DOCUMENTS
JP 2004288111 A * 10/2004

OTHER PUBLICATIONS

Translation of Foreign Patent document, JP2004288111A, Kondo, published Oct. 14, 2004, pp. 1-44.*
"Customizing Microsoft Project Server E-mail Notifications and Reminders", MSDN, Microsoft Corp., 2007.

* cited by examiner

*Primary Examiner* — Laurie Ries
(74) *Attorney, Agent, or Firm* — Patents on Demand, P.A.; Brian K. Buchheit; Scott M. Garrett

(57) ABSTRACT

The present invention discloses a solution for permitting users to customize subject headings of email subscriptions. The customizations can be applied on a per subscription basis and/or on a per sender basis. Further, the customizations can be performed by a software program that changes an original email heading established by a subscription providing source. Specifically, the solution recognizes that most, if not all, subscription emails are automatically generated in consistent fashion and inherently have a repeating structure. The disclosed solution permits a user to identity portions of these repeating structures, which are to be used to generate replacement subject headings designed to be meaningful to the user. The solution can optionally maintain the original subject heading, which can be used in many situations, such as for use when replying or forwarding an email.

17 Claims, 3 Drawing Sheets

CUSTOMIZING EMAIL SUBJECTS FOR SUBSCRIPTION GENERATED EMAIL MESSAGES

BACKGROUND

1. Field of the Invention

The present invention relates to the field of email and, more particularly, to customizing email subjects for subscription generated email messages.

2. Description of the Related Art

Unlike decades past, today's information consumer is rarely inhibited by a lack of information sources. Instead information consumers often suffer from information overload. Numerous techniques have been developed to make consumer desired information more easily digestible to help consumers cope with information overload. One of these techniques is for a consumer to subscribe to one or more information sources, which periodically convey email messages to the user. This saves the consumer the trouble of constantly checking different Web sites, permits the user to view customized messages at their leisure, and often links the consumer to one or more source locations should they want elaborations for content contained in the email messages. Email subscriptions are generally customizable so that information sent is specifically tailored for the receiving user. Email subscriptions exist for news services, Wiki sites, BLOG sites, RSS feeds, merchant sites, and the like.

While information consumers generally appreciate the flexibility afforded by email subscriptions, these subscriptions themselves can be overwhelming, in that a quantity of email messages to be read can be unmanageably large. One reason these emails are somewhat difficult to manage is that email subscriptions provide generic subject headings relating to a subscription. For example, a news service email can have a subject heading of "IP LAW News for Dec. 10, 2007." To determine if this message contains important information, an information consumer must open and read the content of this message. Considering the quantity of email messages many consumers receive, email messages important to a consumer can be easily delayed or overlooked, effectively being lost in a forest of other email messages of lesser import to the consumer.

SUMMARY OF THE INVENTION

The present invention discloses a solution for permitting users to customize subject headings of email subscriptions. The customizations can be applied on a per subscription basis and/or on a per sender basis. Further, the customizations can be performed by a software program that changes an original email heading established by a subscription providing source. Specifically, the solution recognizes that most, if not all, subscription emails are automatically generated in consistent fashion and inherently have a repeating structure. The disclosed solution permits a user to identity portions of these repeating structures, which are to be used to generate replacement subject headings designed to be meaningful to the user. The solution can optionally maintain the original subject heading, which can be used in many situations. For example, when a user replies or forwards a subscription email he/she may opt to use the original subject heading instead of the customized replacement heading, which could be confusing to a recipient of the reply/forwarded email.

The present invention can be implemented in accordance with numerous aspects consistent with the materials presented herein. One aspect of the present invention can include a method for customizing the subject heading of subscription email. In the method, an email message automatically generated as part of an email subscription can be received, where the email message has an original subject heading. A transformation data store can be queried to determine a conversion template associated with the email subscription. A replacement subject heading can be constructed based upon construction rules specified by the determined conversion template. The replacement subject heading can include textual content extracted from a body or an original subject heading of the received email message. The subject heading that is to appear within an email application that presents the received email message to a user is the replacement subject heading.

Another aspect of the present invention can include a method for customizing subject headings of email messages. The method can identify a repeating structure included within a subject heading or a body of an automatically generated email message. A set of rules based upon user established criteria can be identified that generates a subject heading based at least in part upon content contained within at least one of the repeating structures. An email message having an original subject can be received. A determination can be made that the set of rules apply to the email message. A replacement subject heading can be generated using the set of rules. The original subject heading of the email message can be replaced with the replacement subject heading.

Still another aspect of the present invention can include an email system that includes a subscription construction engine, an email server, a conversion engine, and at least one client-side email application. The subscription construction engine can construct email messages having original subject headings that are automatically created and conveyed to email addresses associated with a set of subscribers. The email server can serve the constructed email messages to email addresses associated with the set of subscribers in accordance with subscription settings. The conversion engine can construct replacement subject headings for the original subject headings in accordance with subscription specific conversion rules. Each of the replacement subject headings can include textual content extracted from a body and/or an original subject heading of an associated email message to which the replacement heading corresponds. A client-side email application can receive email messages served by the email server. The client-side email application can be associated with one of the email addresses. Subject headings associated with each of the received email messages served by the email server that appear within the client-side email application can be said replacement headings.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
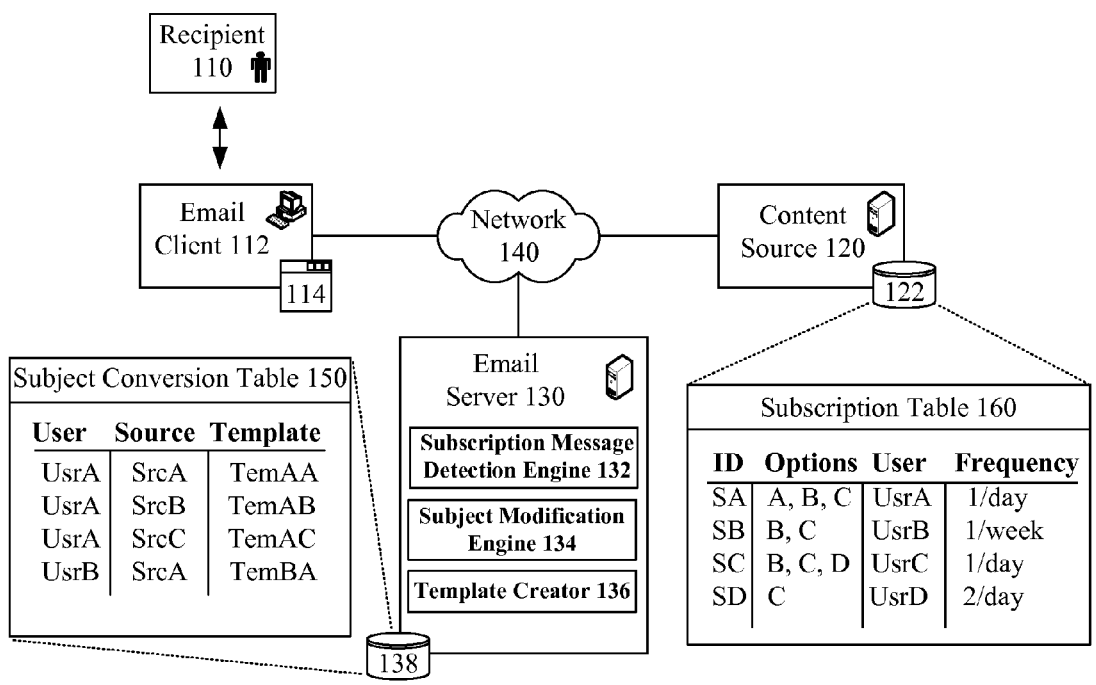
FIG. 1 is a schematic diagram of a system for replacing email subject headings with customized subject headings in accordance with an embodiment of the inventive arrangements disclosed herein.

FIG. 1 is a schematic diagram of a system 100 for replacing email subject headings with customized subject headings in accordance with an embodiment of the inventive arrangements disclosed herein. An original subject, which is replaced, can be one automatically generated by a content source 120 in accordance with an email subscription to which a recipient 110 subscribes. That is, a content source 120 can create email messages, which are conveyed over a network 140 to an email client 112 by an email server 130. Recipient 110 can use an email interface 114 to view the email, which can contain a replacement subject heading.

Although FIG. 1 shows engines 132, 134 and creator 136 to be located in email server 130, the invention is not so limited. Instead, the engines 132, 134 can be located within a server of the content source 120 that performs post message creation modifications, can be a client-side program executing in client 112, or can execute within a network 140 element (not shown) having access to the email message at some point between origination of the message and when the message is viewed.

In FIG. 1, the content source 120 can store subscription information in a subscription table 160 of a data store 122. The subscription table 160 can store recipient 110 specific settings. For example, a recipient can specify one or more options (e.g., Options A, B, C, D, etc.) for content, such as receiving content only about a certain subset of topics available to the content source 120. Recipient 110 configurable settings also permit a frequency of messages to be established. The content source 120, as shown, fails to include an option that allows the recipient 110 to configure a subject heading. This configuration/change is performed by the subject modification engine 134.

Subject modifications can be recipient 110 configured through use of the template creator 136, which permits the recipient 110 to specify an expression for generating a replacement heading. The expression can include content parsed from either the original email subject heading or from the body of an original email message. Templates can use the fact that most subscription emails have a repeating internal structure, portions of which are identified when creating a conversion template. Additionally, templates can utilize data not contained in the email subject/body, such as using a system date, using user specified text, and the like. Further, once created, templates can be shared among a set of users and modified/reused.

Once a conversion template is created, it can be associated with a particular source and/or recipient, as shown by table 150. The subscription message detection engine 132 can use table 150 information to determine if an examined email message is associated with a template to be used to convert the original subject heading. For example, Template AA can apply to messages from a Source A directed to a User A. Source and user determinations can be based upon email addresses or other identifying information, such as IP address. In one implementation, a template can be applied against all messages from a particular source or subscription regardless of who the recipient is. Moreover, a default template can be established for a given source, which can be customized on a per-recipient basis as desired.

The subject modification engine 134 can identify structures of an existing email message defined by a template. Content can be extracted from these structures and used when building a replacement subject heading in accordance with a user defined subject building expression. An original heading can be optionally preserved by engine 134 when the subject heading is changed. For example, the engine 134 can place the original subject heading within a metadata field of the converted email message.

As used herein, email client 112 can be any computing device able to receive email messages. Client 112 can, for example, be a desktop computer, a smart phone, an email station, and the like. The email interface 114 can be an email application executing upon client 112 and/or can be a browser interface for accessing Web based email. Email server 130 can be a computing device and associated software configured to send and receive email messages. The content source 120 can be a computing device and associated software configured to generate email messages in accordance with a subscription.

Network 140 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 140 can include local components and data pathways necessary for communications to be exchanged among computing device components and between integrated device components and peripheral devices. The network 140 can also include network equipment, such as routers, data lines, hubs, and intermediary servers which together form a packet-based network, such as the Internet or an intranet. The network can further include circuit-based communication components and mobile communication components, such as telephony switches, modems, cellular communication towers, and the like. The network 140 can include line based and/or wireless communication pathways.

Data stores 122, 138 can be physically implemented within any type of hardware including, but not limited to, a magnetic disk, an optical disk, a semiconductor memory, a digitally encoded plastic memory, a holographic memory, or any other recording medium. Each of the data stores 122 and 138 can be stand-alone storage unit as well as a storage unit formed from a plurality of physical devices, which may be remotely located from one another. Additionally, information can be stored within each of the data stores 122 and 138 in a variety of manners. For example, information, such as table 150 and/or table 160, can be stored within a database structure or can be stored within one or more files of a file storage system, where each file may or may not be indexed for information searching purposes.

Figure 2:
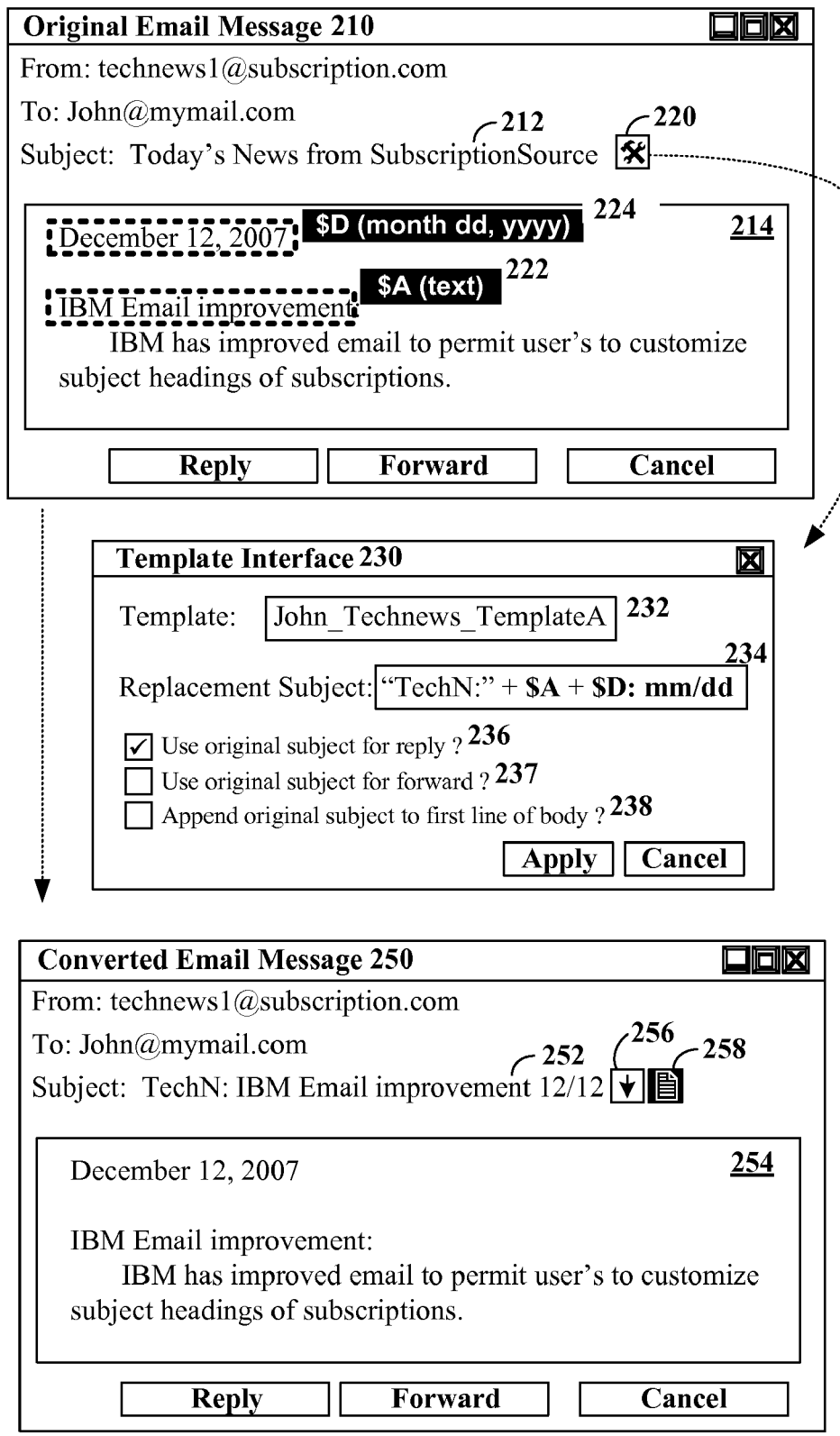
FIG. 2 shows a set of interfaces that demonstrate replacing an original subject heading of an email with a customized one.

FIG. 2 shows a set of interfaces 210, 230, 250 that demonstrate replacing an original subject heading of an email with a customized one. The interfaces 210, 230, 250 can be used in a system 100 or any system that permits users to customize email subject headings in accordance with the inventive arrangements disclosed herein. The interfaces 210, 230, 250 are provided for illustrative purposes only, and the invention is not to be construed as limited to the interface elements, arrangements, or design of FIG. 2.

Interface 210 shows an original email message from a subscription source (e.g., technews1@subscription.com) to an email subscription recipient (e.g., John@mymail.com). An original subject heading 212 (e.g., Today's news from SubscriptionSource) can be changed to a replacement subject heading 252 (e.g., TechN: IBM Email improvement 12/12) when processed through a subject modification engine that generates converted email message 250. The content 214, 254 of the original 210 and converted 250 messages can remain the same. In one embodiment, an option 256 can be provided to view the original subject. Another option 258 can toggle a setting for displaying either the original or the converted subject heading.

The interface of the original message 210 can include a configuration option 220 for defining a conversion template for a received message. Selection of option 220 can result in template interface 230 being displayed. In interface 230, a user can define a template 232 to be applied to emails of the type shown by message 210. For example, the template 232 can apply to messages from a subscription source of technews1@subscription.com that are directed to a specific email recipient, such as John mymail.com.

The interface 230 can permit the user to establish expressions 234 defining a replacement subject. For example, a user can highlight portions of the message 210 and associate variables to those selection. For example, a variable $A can be established for a highlighted section 222 showing a news article title of "IBM Email improvement." A different variable $D can be established for a highlighted section 224 showing a date of Dec. 12, 2007. Highlighting 222, 224 portions of content can cause an underlying structure to be determined, so that subsequent messages having equivalent structure will be handled in a manner defined by expression 234.

In one embodiment, structure details can be automatically shown when highlighting 222, 224 a section. For example, a structure associated with variable $A can be text and a structure associated with variable $D can be a date in a specific format. When specifying variables in the expression 234, a user can optionally specify a desired format, which can be different from an original format. For example, a date associated with $D variable can be specified as having a mm/dd format. Any expression 234 defining technique can be used for the invention, which is not limited to the illustrated expression defining technique.

One or more additional configuration settings 236-238 can also be defined using interface 230. For example, a user can specify whether an original subject 236 is to be used when replying to an email message, as opposed to using the replacement subject when replying. Another option 237 can specify whether to use an original or replacement subject when forwarding a received email message. Still another option 238 can specify whether an original subject is to be appended to the first line of a body of the email, to below the replacement subject, or to some other location.

Figure 3:
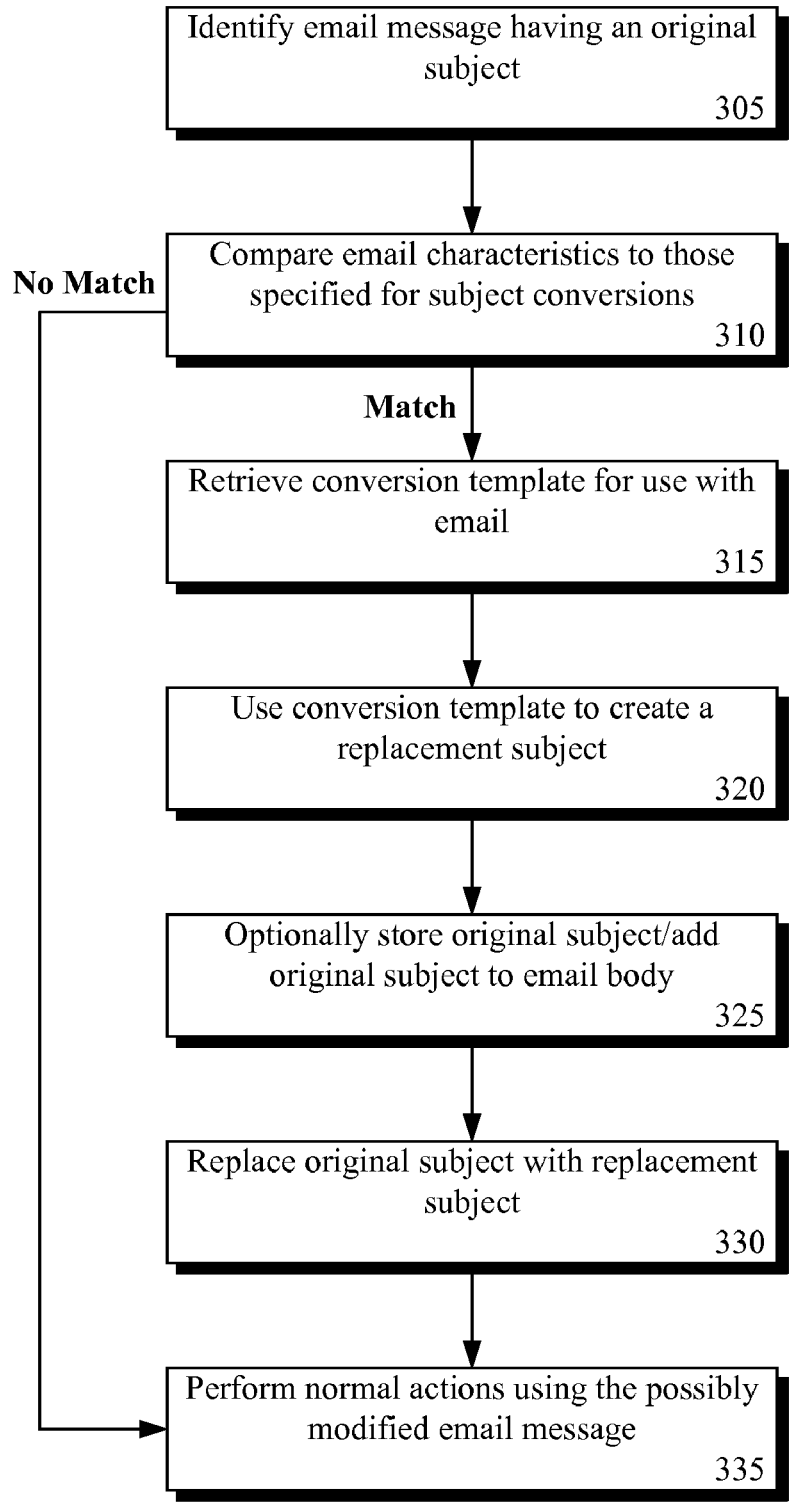
FIG. 3 is a flow chart of a method for situationally replacing an original email subject heading with a customized one.

FIG. 3 is a flow chart of a method 300 for situationally replacing an original email subject heading with a customized one. Method 300 can be performed in the context of system 100. For example, steps of method 300 can be those performed by subject message detection engine 132 and/or subject modification engine 134. Method 300 can be performed at any of a variety of stages during an email message's lifecycle. For instance, the steps of method 300 can be performed before an email message is conveyed from an email server, can be performed against an email message between when the message was conveyed by a server and when it is received by a client, and/or the method steps can be performed after an email message has been conveyed to a recipient destination.

Method 300 can begin in step 305, where an email message having an original subject can be identified. In step 310, characteristics of the identified email message can be compared to those specified for candidate messages to undergo subject conversions. Candidate messages can include those conveyed as part of a subscription. Characteristics unique to a subscription checked in step 310 can include a sender's email address as well as a recipient's email address. When no matching characteristics are found, normal email actions can be performed for the identified message, as shown by step 335.

When the compared characteristics match, the method can proceed from step 310 to step 315, where a conversion template associated with the matched characteristics can be retrieved from a data store. In one optional step (not shown), structure of the identified email can be compared against structure of a conversion template to ensure that the conversion specified by the template will be successful. If the structures of the template and the email message do not match, an error message can be presented and the method can skip to step 335 without modifying the subject heading.

Otherwise, the conversion template can be applied to create a replacement subject heading, as shown by step 320. In step 325, the original subject heading can be optionally stored so that a recipient can view the original heading and/or use the original heading when replying/forwarding the received email message. In one configuration, an original subject heading can be appended to an email body. In another configuration, the original subject heading can be placed in a metadata field of the identified message. In step 330, the original subject can be replaced with the replacement subject. In step 335, normal actions can be performed using the modified email message.

The present invention may be realized in hardware, software or a combination of hardware and software. The present invention may be realized in a centralized fashion in one computer system or in a distributed fashion where different elements are spread across several interconnected computer systems. Any kind of computer system or other apparatus adapted for carrying out methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for customizing the subject heading of subscription email comprising:

receiving an email message automatically generated as part of an email subscription, said email message having an original subject heading;

querying a transformation data store to determine a conversion template associated with the email subscription;

establishing a plurality of different conversion templates within the transformation data store, each of the plurality of conversion templates being associated with a specific email subscription; and constructing a replacement subject heading based upon construction rules specified by the determined conversion template, wherein the replacement subject heading comprises textual content extracted from at least one of a body and the original subject heading of the received email message, wherein a subject heading that is to appear within an email application that presents the received email message to a user is the constructed replacement subject heading.

2. The method of claim 1, wherein the conversion template identifies a repeating structure of messages generated as part of the email subscription, wherein the textual content extracted is associated with the identified repeating structure.

3. The method of claim 2, further comprising:
providing a template creation interface for a user to select the identified repeating structure; and
automatically generating the conversion template from user selections made using the template creation interface.

4. The method of claim 1, wherein each of the plurality of conversion templates is further associated with a specific subscriber email address.

5. The method of claim 1, further comprising:
maintaining the original subject heading after the replacing step; and
including an option for the email application to use the original subject heading as a basis for creating a subject heading that is automatically generated when forwarding or replying to the received email message.

6. The method of claim 5, wherein when the option is active, a subject heading used when forwarding the received email message is an indicator for forwarding followed by the original subject heading, and wherein when the option is active, a subject heading when replying to the received email message is an indicator for replying followed by the original subject heading.

7. The method of claim 1, wherein the steps of claim 1 are performed by a software program stored in a machine readable medium, wherein the software program is a client-side program executing upon a client upon which the email application executes.

8. The method of claim 1, wherein the steps of claim 1 are performed by a software program stored in a machine readable medium, wherein the software program is a server-side program executing upon an email server, which serves the email message.

9. The method of claim 1, wherein the steps of claim 1 are performed by a software program stored in a machine readable medium, wherein the software program is a middleware program executing within a middleware server.

10. The method of claim 1, wherein the steps of claim 1 are performed in accordance with a set of programmatic instructions defined within a Web service, said programmatic instructions being stored in a machine readable medium and executed by a machine whenever an instance of the Web service runs.

11. A method for customizing subject headings of email messages comprising:
identifying a repeating structure included within at least one of a subject heading and a body of an automatically generated email message;
creating a set of rules based upon user established criteria to generate a subject heading based at least in part upon content contained within at least one of the repeating structures;
receiving an email message having an original subject;
determining that the set of rules apply to the email message;
generating a replacement subject heading using the set of rules; and
replacing the original subject heading of the email message with the replacement subject heading, wherein the email message is automatically generated as part of a subscription, wherein the set of rules apply on a per-subscription basis.

12. The method of claim 11, wherein the set of rules apply on a per sender basis.

13. The method of claim 11, wherein the receiving, determining, generating, and replacing steps occur after an email message has been generated by a content source for conveyance to a recipient and before the recipient is presented with the email message within an email interface.

14. The method of claim 11, further comprising:
providing a rule establishment interface configured to permit a user to graphically select a portion of a received email message, wherein the graphically selected portion is used to identity a repeating structure for the set of rules of the creating step.

15. The method of claim 11, wherein said steps of claim 11 are performed by at least one machine in accordance with at least one computer program stored in a computer readable media, said computer programming having a plurality of code sections that are executable by the at least one machine.

16. An email system comprising:
a subscription construction engine configured to construct email messages having original subject headings that are automatically created and conveyed to email addresses associated with a set of subscribers;
an email server configured to serve the constructed email messages to email addresses associated with the set of subscribers in accordance with subscription settings;
a conversion engine configured to construct replacement subject headings for the original subject headings in accordance with subscription specific conversion rules, wherein each of said replacement subject headings comprise textual content extracted from at least one of a body and a subject heading of an associated email message to which the replacement heading corresponds, wherein said conversion rules are user configurable rules specific to an email subscription and specific to an email address associated with one of the subscribers; and
at least one client-side email application configured to receive email messages served by the email server, wherein said client-side email application is associated with one of the email addresses, wherein subject headings associated with each the received email messages served by the email server that appear within the client-side email application are said replacement headings, wherein said subscription construction engine and said conversion engine are a software implemented engine defined by a set of programmatic instructions stored in a machine readable medium configured to be executed by a machine.

17. The email system of claim 16, wherein the email application comprises a user selectable option to use the original subject heading as a basis for creating a subject heading that is automatically generated when forwarding or replying a received email messages that has a replacement heading, wherein when the option is active, a subject heading used when forwarding the received email message is an indicator for forwarding followed by the original subject heading, and wherein when the option is active, a subject heading when replying to the received email message is an indicator for replying followed by the original subject heading.

* * * * *